(12) United States Patent
Lee et al.

(10) Patent No.: US 10,812,171 B2
(45) Date of Patent: Oct. 20, 2020

(54) INTERFERENCE CANCELLATION METHOD AND APPARATUS FOR WIRELESS COMMUNICATION SYSTEM

(71) Applicant: Samsung Electronics Co., Ltd., Gyeonggi-do (KR)

(72) Inventors: Ikbeom Lee, Gyeonggi-do (KR); Jinhwan Kang, Gyeonggi-do (KR); Chongdon Kim, Gyeonggi-do (KR); Hayoung Yang, Gyeonggi-do (KR); Joohyun Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/850,795

(22) Filed: Dec. 21, 2017

(65) Prior Publication Data

US 2018/0183510 A1 Jun. 28, 2018

(30) Foreign Application Priority Data

Dec. 26, 2016 (KR) .................. 10-2016-0179253

(51) Int. Cl.
| | |
|---|---|
| *H04B 7/08* | (2006.01) |
| *H04W 72/08* | (2009.01) |
| *H04J 11/00* | (2006.01) |
| *H04L 5/00* | (2006.01) |
| *H04B 17/345* | (2015.01) |

(52) U.S. Cl.
CPC ......... *H04B 7/0857* (2013.01); *H04B 7/0837* (2013.01); *H04B 7/0854* (2013.01); *H04B 17/345* (2015.01); *H04J 11/005* (2013.01); *H04J 11/0053* (2013.01); *H04L 5/0073* (2013.01); *H04W 72/082* (2013.01)

(58) Field of Classification Search
CPC .. H04B 7/0857; H04B 17/345; H04B 7/0837; H04B 7/0854; H04J 11/005; H04J 11/0053; H04L 5/0073; H04W 72/082
See application file for complete search history.

(56) References Cited

U.S. PATENT DOCUMENTS

| | | | | |
|---|---|---|---|---|
| 6,167,039 A * | 12/2000 | Karlsson | .............. | H04B 7/0854 370/320 |
| 6,922,434 B2 * | 7/2005 | Wang | .................. | H04B 1/7117 375/148 |
| 7,778,355 B2 * | 8/2010 | Onggosanusi | ....... | H04B 7/0669 375/299 |
| 8,121,176 B2 * | 2/2012 | Guess | ................ | H04B 1/71075 375/148 |

(Continued)

*Primary Examiner* — Huy D Vu
*Assistant Examiner* — Bailor C. Hsu
(74) *Attorney, Agent, or Firm* — The Farrell Law Firm, P.C.

(57) ABSTRACT

An interference cancellation method and apparatus of a base station is provided for use in a wireless communication system, which includes receiving a first signal by a first antenna and a second signal by a second antenna, measuring interference amounts in the first signal and the second signal based on a result of channel measurement performed on the first signal and the second signal, and generating a third signal as a target of decoding by adjusting channel parameters associated with channel conditions of the first antenna and the second antenna based on the measured interference amounts. The channel parameters are generated based on the channel measurement result.

10 Claims, 7 Drawing Sheets

(56) References Cited

U.S. PATENT DOCUMENTS

| | | | | |
|---|---|---|---|---|
| 8,355,474 | B2* | 1/2013 | De Carvalho | H04B 7/0854 |
| | | | | 375/259 |
| 8,380,154 | B2* | 2/2013 | Lindqvist | H04B 7/0854 |
| | | | | 455/296 |
| 8,483,641 | B1* | 7/2013 | Mayrench | H04B 1/1027 |
| | | | | 455/226.1 |
| 8,744,360 | B2* | 6/2014 | Zheng | H04B 7/18563 |
| | | | | 455/12.1 |
| 9,197,344 | B2* | 11/2015 | Cyzs | H04B 17/345 |
| 9,231,632 | B2* | 1/2016 | Kang | H04B 1/12 |
| 9,686,069 | B2* | 6/2017 | Chen | H04L 5/006 |
| 9,787,450 | B2* | 10/2017 | Kim | H04B 7/0417 |
| 9,986,444 | B2* | 5/2018 | Kim | H04B 7/024 |
| 2008/0231500 | A1* | 9/2008 | Heikkila | H04L 1/20 |
| | | | | 342/159 |
| 2009/0280747 | A1* | 11/2009 | Sudarshan | H04L 25/0204 |
| | | | | 455/63.1 |
| 2014/0314189 | A1 | 10/2014 | Sagae et al. | |

* cited by examiner

INTERFERENCE CANCELLATION METHOD AND APPARATUS FOR WIRELESS COMMUNICATION SYSTEM

PRIORITY

This application claims priority under 35 U.S.C. § 119(a) to Korean Patent Application Serial No. 10-2016-0179253, which was filed in the Korean Intellectual Property Office on Dec. 26, 2016, the entire content of which is incorporated herein by reference.

BACKGROUND

1. Field of the Disclosure

The present disclosure relates generally to a method and apparatus for cancelling interference from a signal based on the interference amount measured by a base station in a long-term evolution (LTE) system.

2. Description of the Related Art

Mobile communication has evolved into a high-speed, high-quality wireless packet data communication system capable of providing data and multimedia services beyond the predecessor voice-oriented services. The existing third generation (3G) mobile communication systems adopt various technologies for improving transmission efficiency such as multiple-input multiple-output (MIMO) technology which is capable of transmitting spatially separated information streams using a plurality of transmit and receive antennas.

In a cellular communication system characterized by a handover event occurring between base stations when a terminal moves from one cell to another, it is typical to use a frequency reuse technology to improve the utilization efficiency of the limited frequency spectrum resources. However, the frequency reuse may cause inter-cell interference among the cells operating on the same frequency. The inter-cell interference increases both bit and frame error rates, or may cause a control channel error which results in the connection being dropped.

In order to mitigate performance degradation caused by inter-cell interference, adoption of an interference rejection combining (IRC) technique may be considered. The IRC technique is capable of improving throughput in a radio environment by combining signals received with a plurality of antennas and canceling interference signals. The IRC technique is capable of removing interference components from a signal transmitted by a transmitting part (e.g., terminal within a cell) in such a way for a base station equipped with multiple antennas to measure the channel conditions based on the signal received through the respective antennas and reflect the measured channel conditions to the signals, which are combined according to an algorithm.

In the case of using the IRC technique, however, the interference and noise affecting the channel condition or lack of rank may reduce the interference cancellation effect.

SUMMARY

Accordingly, an aspect of the present disclosure provides an interference cancellation method and apparatus that is capable of improving interference cancellation effectively by measuring an interference amount included in a received signal and removing interference from the received signal in consideration of the measured interference amount.

In accordance with an aspect of the present disclosure, a method of a base station with a plurality of antennas in a wireless communication system includes receiving a first signal by a first antenna and a second signal by a second antenna; measuring interference amounts in the first signals and the second signal based on a result of channel measurement performed on the first signals and the second signal; and generating a third signal as a target of decoding by adjusting channel parameters associated with channel conditions of the first antenna and the second antenna based on the measured interference amounts. The channel parameters are generated based on the channel measurement result.

In accordance with another aspect of the present disclosure, a base station having a plurality of antennas in a wireless communication system includes a radio communication unit having a first antenna for receiving a first signal and a second antenna for receiving a second signal; and a controller configured to measure interference amounts in the first signals and the second signal based on a result of channel measurement performed on the first signals and the second signal, and generate a third signal as a target of decoding by adjusting channel parameters associated with channel conditions of the first antenna and the second antenna based on the measured interference amounts. The channel parameters are generated based on the channel measurement result.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
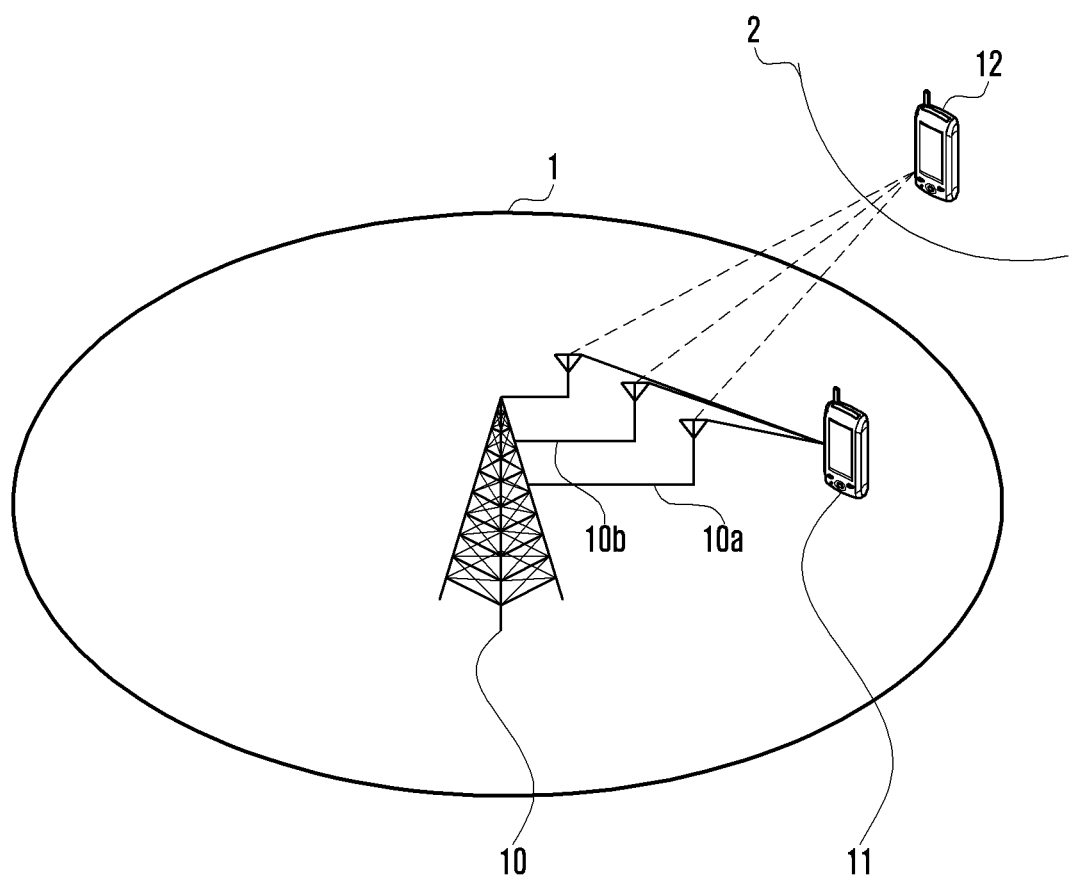
FIG. 1 is a diagram illustrating a relationship among a cell, a base station, and a mobile terminal.

Detailed descriptions of well-known functions and structures incorporated herein may be omitted to avoid obscuring the subject matter of the present disclosure. Further, the following terms are defined in consideration of the functionality in the present disclosure, and they may vary according to the intention of a user or an operator, usage, etc.

Therefore, the definition should be made on the basis of the overall content of the present specification.

A person skilled in the art will understand that the present disclosure can be applied even to other communication and computing systems having a similar technical background and channel format, with modification, without departing from the spirit and scope of the present disclosure.

Advantages and features of the present disclosure, and methods of accomplishing the same may be understood more readily with reference to the following detailed description of embodiments and the accompanying drawings. The present disclosure may, however, be embodied in many different forms and should not be construed as being limited to the embodiments set forth herein; these embodiments are provided so that the present disclosure will be thorough and complete, and will fully convey the concept of the present disclosure to those skilled in the art, and the present disclosure will only be defined by the appended claims and their equivalents. Like reference numerals refer to like elements throughout the present disclosure.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions which are executed via the processor of the computer or other programmable data processing apparatus that create methods for implementing the functions and/or acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture with embedded instruction methods which implement the function and/or act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions and/or acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order with several modifications. For example, two successive blocks may be performed substantially at the same time, or they may be performed in reverse order according to their functions.

The term "module", used in this disclosure may refer to a certain unit that includes one of software, a hardware component, firmware, or any combination thereof, such as a field programmable gate array (FPGA) or application specific integrated circuit (ASIC). A module may be configured to reside on the addressable storage medium and configured to be executed on one or more processors. Thus, a module may include components, such as software components, object-oriented software components, class components, task components, processes, functions, attributes, procedures, subroutines, segments of program code, drivers, firmware, microcode, circuitry, data, databases, data structures, tables, arrays, and variables. The functionality provided for in the components and modules may be combined with other components and modules, or further separated into additional components and modules. In addition, the components and modules may be implemented such that they execute one or more central processing units (CPUs) in a device or a secure multimedia card.

The following description is directed to a method and apparatus for executing the IRC technique effectively to remove interference from a signal transmitted by a terminal in such a way that a base station equipped with a plurality of antennas removes the interference from the transmitted signal in consideration of the channel conditions related to the respective antennas.

First, a description is made to a method for performing the IRC technique.

FIG. 1 is a diagram illustrating a relationship among a cell, a base station, and a mobile terminal.

Referring to FIG. 1, a base station 10 forming a cell 1 is equipped with a plurality of antennas 10a and 10b for receiving radio signals. The cell 1 may be located close to another cell 2, and at least one mobile terminal 11 may be located within the cell 1. If the mobile terminal 11 transmits a signal to the base station 10, the base station 10 may receive the signal transmitted by the mobile terminal 11 using the antennas 10a and 10b. For example, the signal transmitted from the mobile terminal 11 to the base station 10 may be received by the respective antennas 10a and 10b. In this case, the signals received by the respective antennas 10a and 10b may be affected by the interference of a signal transmitted by another terminal 12 located within the neighboring cell 2. For example, the base station 10 may receive the signal transmitted by the mobile terminal 11 as a first signal by means of the first antenna 10a and a second signal by means of the second antenna 10b, where the first and second antennas 10a and 10b have different channel conditions.

Assuming the first signal received by the first antenna 10a is $y_0$ and the second signal received by the second antenna 10b is $y_1$, the first and second signals may be expressed as Equations (1) and (2), respectively.

$$y_0 = h_0 \cdot x + n_o \quad (1)$$

$$y_1 = h_1 \cdot x + n_1 \quad (2)$$

In Equations (1) and (2), $h_0$, $h_1$, $n_o$, and $n_1$ are values obtained as a result of channel estimation on the first and second signals received by the respective antennas. Here, $h_0$ and $h_1$ denote channel measurement values for the first and second antennas, respectively, x denotes a signal transmitted by a mobile terminal, and $n_o$ and $n_1$ denote noise values for the first and second antennas, respectively.

The base station 10 may combine the first and second signals to generate a third signal using a predetermined scheme to remove interference components from the signal x transmitted by the mobile terminal 11.

In order to generate the third signal, a calculation may be performed by dividing both sides of Equation (1) by $h_o$ and both sides of Equation (2) by $h_1$ for phase matching of signals $y_o$ and $y_1$.

$$\frac{yo}{h0} = x + \frac{no}{h0} \quad (3)$$

-continued $$\frac{y1}{h1} = x + \frac{n1}{h1} \quad (4)$$

Equations (3) and (4) may be added together to result in Equation (5):

$$\frac{y0}{h0} + \frac{y1}{h1} = 2x + \frac{n0}{h0} + \frac{n1}{h1}. \quad (5)$$

Equation (5) can be rearranged by assuming $$\frac{no}{ho} = \sigma_o \text{ and } \frac{n1}{h1} = \sigma_1,$$

and thus the third signal as a combination of $y_o$ and $y_1$ can be expressed as Equation (6):

$$y_{comb} = w_0 \cdot y_o + w_1 \cdot y_1 \quad (6).$$

Here, $w_0$ and $w_1$ can be expressed by a matrix as follows:

$$W = [w_0 w_1]$$

where W may be expressed by Equation (7) through rearrangement of Equation (5).

$$W = \hat{H}^H (\widehat{Rhh} + \widehat{Rnn})^{-1} \quad (7)$$

Here, $\hat{H}$ denotes an $n_R \times n_T$ estimated channel matrix and corresponds to the channel matrix $[h_0\ h_1]$ generated as per-antenna channel estimation results.

In Equation (7), $R_{hh}$ and $R_{nn}$ can expressed using the channel measurement value h and ratio of channel measurement to the channel condition-specific interference σ as follows:

$$R_{hh} = \begin{bmatrix} |h_0|^2 & h_0 h_1^* \\ h_0 * h_1 & |h_1|^2 \end{bmatrix}$$

$$R_{nn} = \begin{bmatrix} |\sigma_0|^2 & \sigma_0 \sigma_1^* \\ \sigma_0 * \sigma_1 & |\sigma_1|^2 \end{bmatrix}$$

In detail, $R_{hh}$ may refer to a covariance matrix generated using the first antenna channel measurement value $h_o$ and the second antenna channel measurement value $h_1$. Hereinafter, $R_{hh}$ is referred to as a first channel parameter. Likewise, $R_{nn}$ may refer to a covariance matrix generated using the first antenna noise-channel measurement ratio $\sigma_o$ and the second antenna noise-channel measurement ratio $\sigma_1$. Here, $R_{nn}$ may be used as a parameter reflecting interference and noise degrees on the channels of the first and second antennas. Hereinafter, $R_{nn}$ is referred to as a second channel parameter.

Referring to Equations (6) and (7), it is necessary to derive W for generating the third signal. In order to derive W, there should be the inverse matrix of $R_{hh} + R_{nn}$ (hereinafter, referred to as R matrix). The inverse matrix of an R matrix exists when the R matrix is in a well condition in the real field environment. However, it may occur that the inverse matrix diverges because of the lack of rank of the R matrix which is caused by high interference or that the R matrix estimation becomes inaccurate because the allocated resource block (RB) is small. In this case, if the IRC technique for interference cancellation is applied uniformly in all cases, this may cause performance degradation or amplify the degree of performance degradation.

According to an embodiment of the present disclosure, a method for solving the interference cancellation performance degradation problem caused by applying the IRC technique uniformly in all cases without consideration of interference level.

Figure 2:
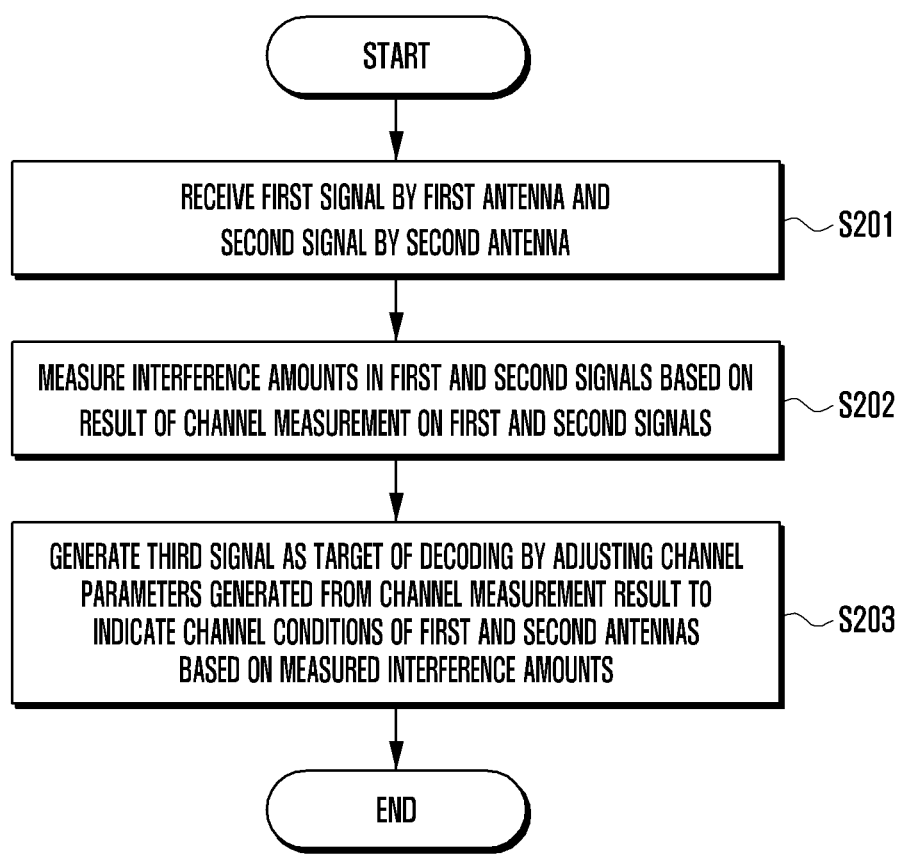
FIG. 2 is a flowchart of an interference cancellation method, according to an embodiment of the present disclosure.

FIG. 2 is a flowchart of an interference cancellation method according to an embodiment of the present disclosure.

Referring to FIG. 2, a base station equipped with a plurality of antennas may receive a first signal by means of a first antenna and a second signal by means of a second antenna in step S201.

The first and second signals may be different versions of the signal x transmitted by a mobile terminal located within a cell of a base station, the received signals being affected by different interferences and noises. That is, the first signal may correspond to $y_0$, and the second signal may correspond to $y_1$.

The base station may perform channel estimation per antenna channel. The base station may measure an interference amount in the first and second signals based on the channel measurement performed on the respective signals, e.g., first and second signals, in step S202.

For example, the base station may perform channel estimation on the first signal to acquire a channel measurement value and noise value of the first signal. The base station may also perform channel estimation on the second signal to acquire a channel measurement value and noise value of the second signal. Here, the channel measurement value may correspond to h, and the noise value may correspond to $n_o$ and $n_1$.

The base station may calculate the interference amounts in each of the first and second signals based on the channel measurement values and noise values of the first and second signals.

The base station may generate channel parameters indicative of the channel conditions of the first and second antennas based on the channel measurement results concerning the first and second signals. The channel parameters may be generated based on the channel measurement values and noise values as channel measurement results for use by the base station in generating the third signal by combining the first and second signals according to a predetermined IRC scheme. For example, the channel parameters may include the first channel parameter $R_{hh}$ as a covariance matrix generated based on the channel measurement values and the second channel parameter $R_{nn}$ as a covariance matrix generated based on the channel measurement value and noise value.

The base station may generate the third signal as a target of decoding in step S203 by adjusting the channel parameters indicative of the channel conditions of the first and second antennas as a result of channel measurement based on the measured interference amounts.

It is possible to overcome the performance degradation problem caused by applying the IRC technique uniformly in all cases without consideration of an interference level in such a way that the base station measures the interference amount in the first and second signals, and adjusts the channel parameters for use in generating the third signal in accordance with the measured interference amounts, e.g., in consideration of the influence of the interference.

Hereinafter, a description is made of the method for adjusting the channel parameters based on the interference amount measured in the first and second signals with reference to FIGS. 3 and 4.

Figure 3:
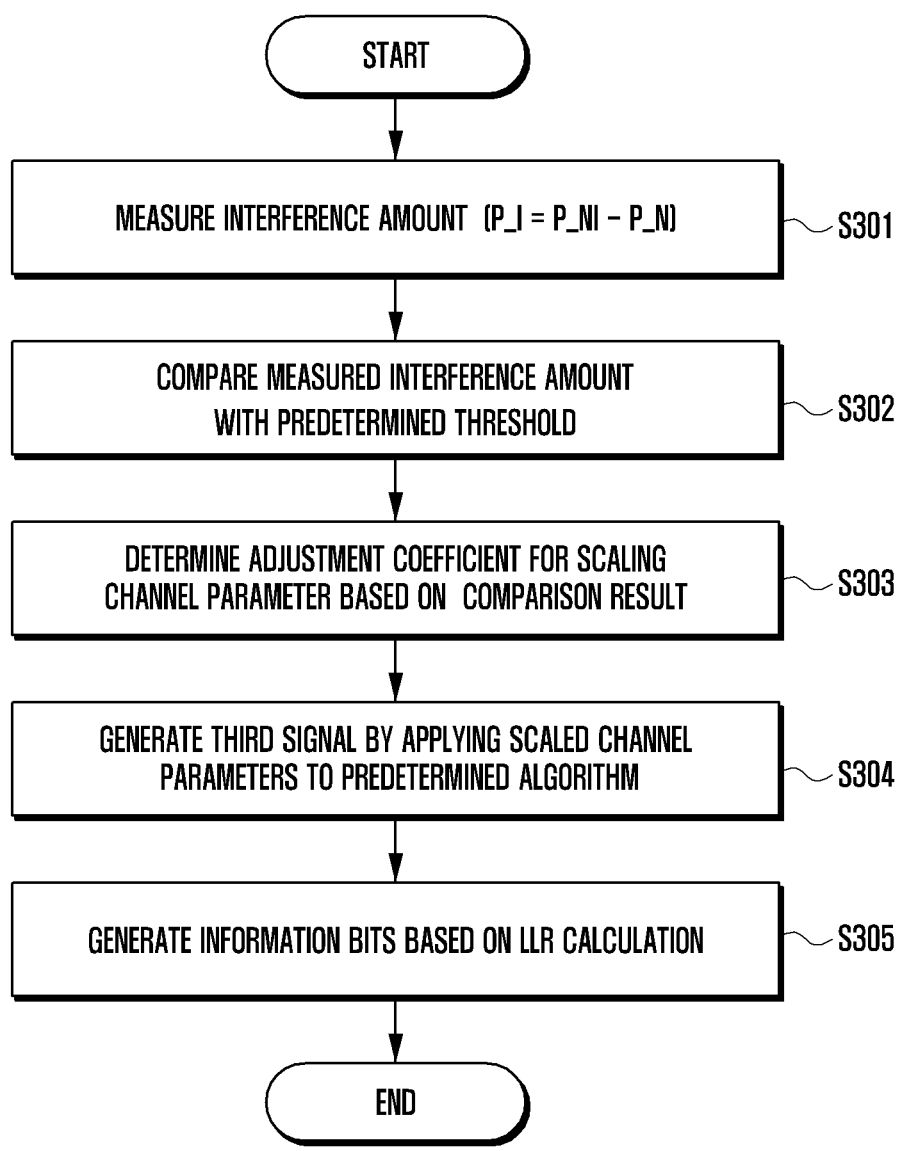
FIG. 3 is a flowchart of a method for generating an interference-cancelled signal based on interference amounts measured in two different received signals, according to an embodiment of the present disclosure.

FIG. 3 is a flowchart of a method for generating an interference-cancelled signal based on interference amounts measured in two different received signals according to an embodiment of the present disclosure.

Referring to FIG. 3, the base station may measure an interference amount in a first signal and a second signal in step S301.

The interference amount P_I may be derived from Equation (8):

$$P\_I = P\_NI - P\_N \quad (8)$$

where P_NI denotes the noise-plus-interference power, and P_N denotes the thermal noise power.

P_NI may be obtained from the second channel parameter $R_{nn}$.

In detail, $$R_{nn} = \begin{bmatrix} |\sigma_0|^2 & \sigma_0 \sigma_1^* \\ \sigma_0 * \sigma_1 & |\sigma_1|^2 \end{bmatrix}$$

may be constructed of diagonal components $|\sigma_2|^2$ and $|\sigma_1|^2$, and off-diagonal components $\sigma_o \sigma_1^*$ and $\sigma_1 \sigma_0$. If the interference components are large in the received signals, the off-diagonal components are relatively large; if the noise components are large in the received signal, the diagonal components are relatively large. Here, P_NI may be determined according to the diagonal components.

For example, the P_N for 100 RBs is calculated by Equation (9) as follows:

$$P\_N = -121 \text{ dBM} = -174 + 10 \log 10(1200 \text{ [tone]} \times 15000 \text{ [Hz]}) \quad (9)$$

After measuring the interference amount as described above, the base station may compare the measured interference amount with a predetermined threshold in step S302. The base station may determine an adjustment coefficient for scaling the channel parameter based on the comparison result in step S303.

The base station may scale $R_{nn}$ to solve the performance degradation problem caused by divergence of the inverse matrix of the R matrix ($R_{hh} + R_{nn}$). For example, it may be possible to minimize the probability of the problem caused by the divergence by scaling the diagonal components such that the diagonal components become greater than the off-diagonal components by as much as a predetermined degree or more.

For example, it may be possible to multiply the diagonal components by constant $\alpha$ and the off-diagonal components by constant $\beta$. If no interference is detected, it may be possible to multiply the off-diagonal components by 0 ($\beta=0$) as well as to multiply the diagonal components by constant $\alpha$ (greater than or equal to 1). If any interference is detected, it may be possible to determine the adjustment coefficient as a ratio between $\alpha$ and $\beta$ to scale the diagonal and off-diagonal components appropriately according to the interference amount. For example, the adjustment parameter may be determined to fulfill $\beta/\alpha=1$ when the interference amount is large.

According to an embodiment of the present disclosure, the adjustment coefficient may be determined according to the result of a comparison between the measured interference amount and a predetermined threshold.

Figure 4:
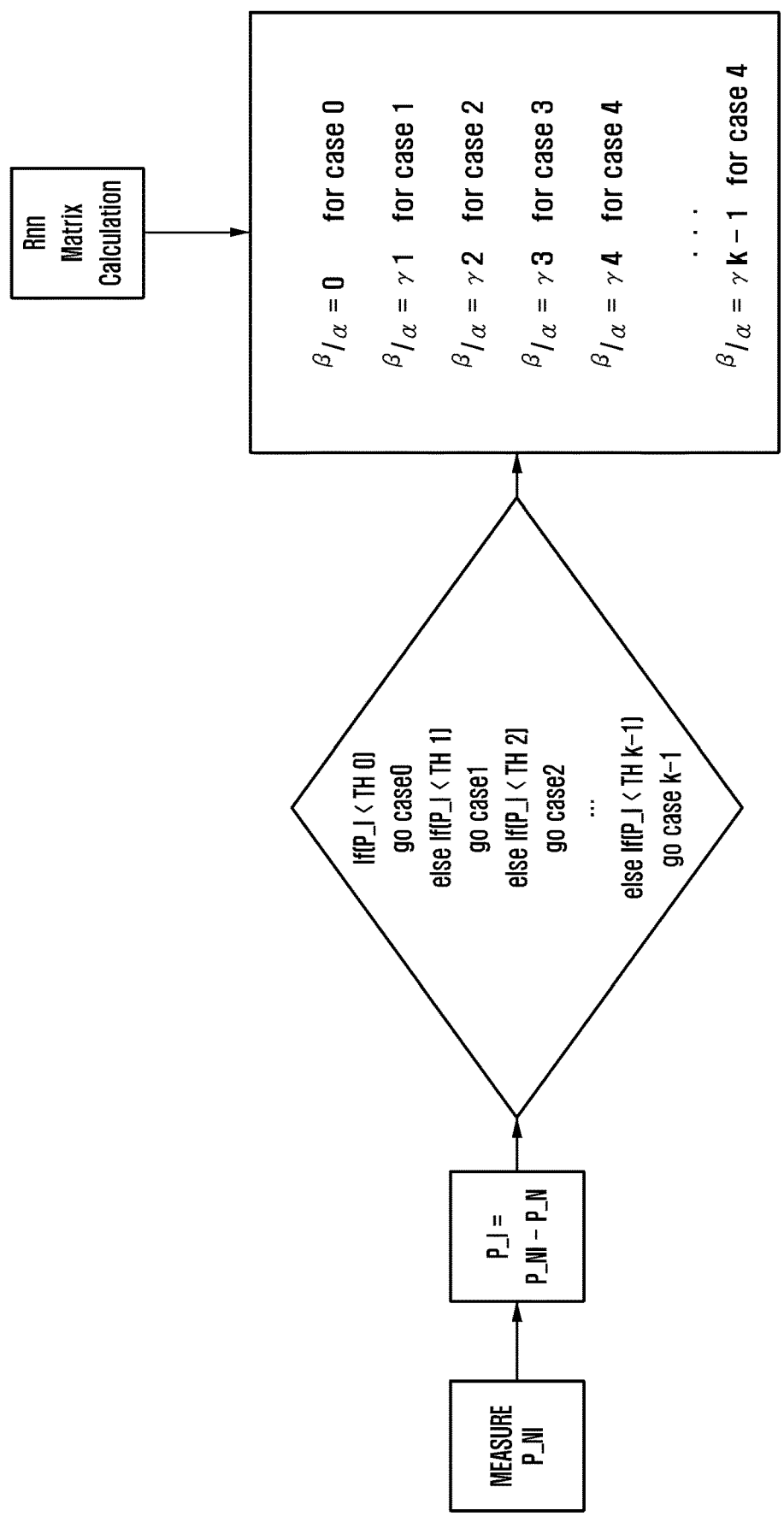
FIG. 4 is a flowchart of a method for determining an adjustment coefficient based on a comparison between an interference amount and a predetermined threshold, according to an embodiment of the present disclosure.

FIG. 4 is a flowchart of a method for determining an adjustment coefficient based on a comparison between an interference amount and a predetermined threshold according to an embodiment of the present disclosure.

Referring to FIG. 4, if the measured interference amount is less than a first threshold (th_0), the adjustment coefficient $\beta/\alpha$ may be set to 0. If the measured interference amount is greater than a second threshold (th_1) and less than a third threshold (th_2), the adjustment coefficient $\beta/\alpha$ may be set to $\gamma$1. If the measurement interference amount is greater than the third threshold (th_2) and less than a fourth threshold (th_3), the adjustment coefficient $\beta/\alpha$ may be set to $\gamma$2. If the measured interference amount is greater than the fourth threshold (th_3) and less than a fifth threshold (th_4), the adjustment coefficient $\beta/\alpha$ may be set to $\gamma$3. For example, if the measured interference amount is greater than a predetermined low threshold (th_k) and less than a predetermined high threshold (th_k+1), the adjustment coefficient $\beta/\alpha$ may be set to $\gamma$k.

Here, $\gamma$ may fulfil the following condition.

$$0 < \gamma 1 < \gamma 2 < \ldots < \gamma k < 1$$

Referring back to FIG. 3, after determining the adjustment coefficient, the base station may scale the channel parameters based on the adjustment coefficient and generate the third signal by applying the scaled channel parameters to a predetermined algorithm in step S304.

Here, the predetermined algorithm may be an algorithm for combining the first and second signals.

For example, the predetermined algorithm may be an antenna combination algorithm such as equal gain combine (EGC), which applies the same weight to antennas in combining the signals received thereby; maximum ratio combine (MRC), which applies weights determined according to antenna-specific signal to noise ratios (SNRs) in combining the signals received thereby; and IRC, which applies minimum mean squared error (MMSE)( ) weights to the antennas in combining the signals received thereby.

After generating the third signal, the base station may calculate a log-likelihood ratio (LLR) and generate information bits based on the LLR in step S305.

According to an embodiment of the present disclosure, the interference cancellation method of the base station is capable of removing the interference included in a received signal effectively in accordance with the degree of interference by measuring an interference amount in the signals received by respective antennas, comparing the measurement interference amount with a predetermined threshold, and scaling the channel parameters based on the comparison result.

Although a description has been made with reference to FIGS. 1 to 4 under the assumption that the base station uses two antennas to receive a signal for the convenience of explanation, the present disclosure is not limited by the number of antennas for use in receiving a signal. For example, it may be possible to generate a channel parameter $R_{nn}$ based on the channel measurement results with the signals received by 4 antennas with the following matrix:

$$R_{nn} = \begin{bmatrix} \alpha \cdot R_{00} & \beta \cdot R_{01} & \beta \cdot R_{02} & \beta \cdot R_{03} \\ \beta \cdot R_{10} & \alpha \cdot R_{11} & \beta \cdot R_{12} & \beta \cdot R_{13} \\ \beta \cdot R_{20} & \beta \cdot R_{21} & \alpha \cdot R_{22} & \beta \cdot R_{23} \\ \beta \cdot R_{30} & \beta \cdot R_{31} & \beta \cdot R_{32} & \alpha \cdot R_{33} \end{bmatrix}$$

Even in this case, it may be possible to determine the adjustment coefficient β/α based on the constants α and β obtained by measuring an interference amount and comparing the measured interference amount and a predetermined threshold.

Figure 5:
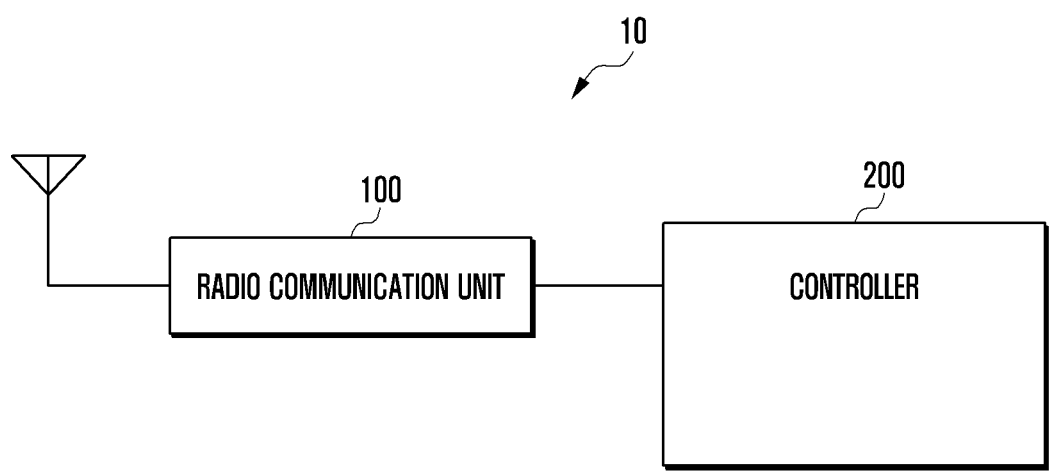
FIG. 5 is a schematic block diagram illustrating a configuration of a base station, according to an embodiment of the present disclosure.
Figure 6:
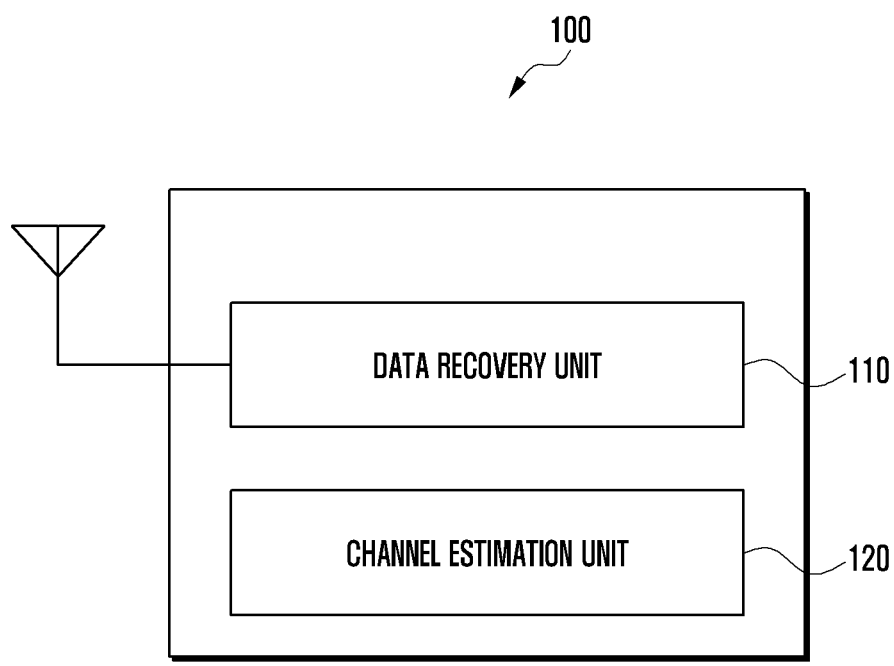
FIG. 6 is a block diagram illustrating a configuration of a radio communication unit of the base station illustrated in FIG. 5, according to an embodiment of the present disclosure.
Figure 7:
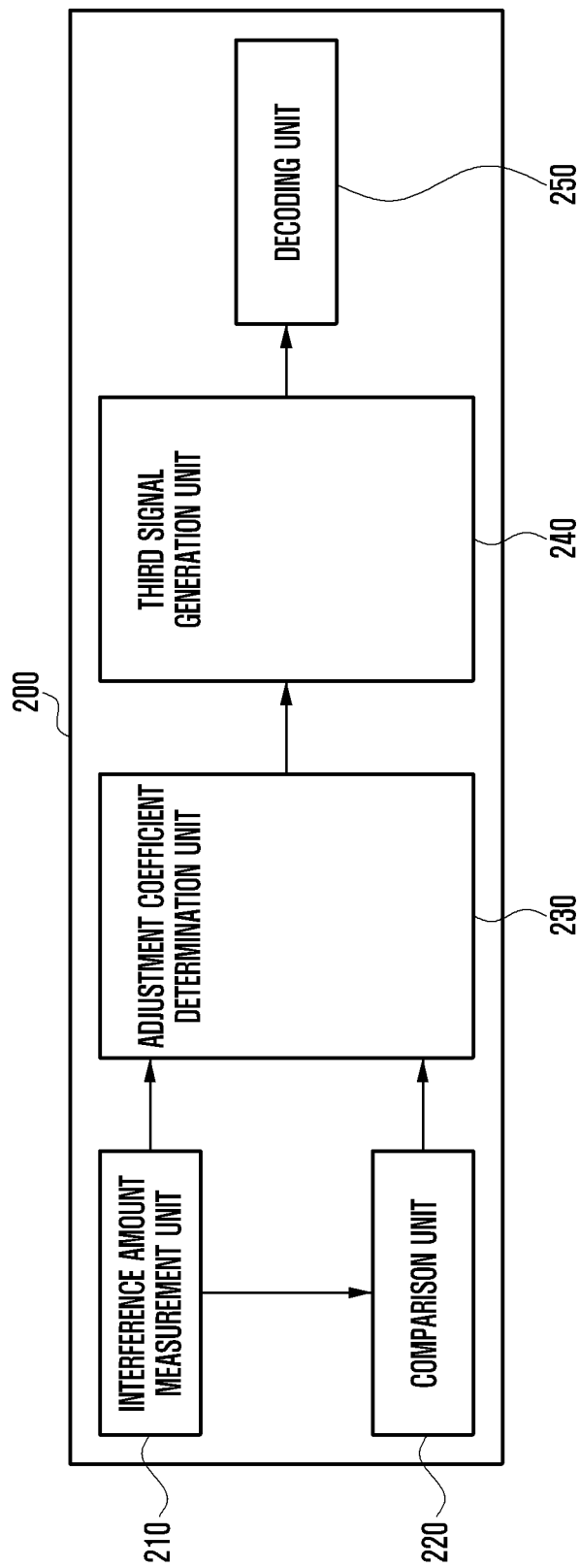
FIG. 7 is a block diagram illustrating a configuration of a controller of the base station illustrated in FIG. 5, according to an embodiment of the present disclosure.

FIG. 5 is a schematic block diagram illustrating a configuration of a base station according to an embodiment of the present disclosure, FIG. 6 is a block diagram illustrating a configuration of a radio communication unit of the base station illustrated in FIG. 5, and FIG. 7 is a block diagram illustrating a configuration of a controller of the base station illustrated in FIG. 5.

Referring to FIG. 5, the base station 10 may include a radio communication unit 100 and a controller 200.

Referring to FIGS. 5 and 6, the radio communication unit 100 may transmit and receive radio signals by means of a plurality of antennas. For example, the radio communication unit 100 may receive radio signals transmitted by a terminal or transmit a signal through a radio channel by means of a plurality of antennas. The radio communication unit 100 may include a data recovery unit 110, which may recover data from the signal received by the antennas. The data recovery unit 110 may include at least one of a demodulation block and a channel decoding block for recovering data from the received radio signals. The radio communication unit 100 may also include a channel estimation unit 120, which estimates a channel based on the received signal. The channel estimation unit 120 may perform received signal power measurement based on the received uplink signal to estimate a channel.

Referring to FIGS. 5 and 7, the controller 200 may include an interference amount measurement unit 210 based on the channel measurement result received from the radio communication unit 100 in consideration of the channel condition. The interference amount measurement unit 210 may also generate a channel parameter indicative of channel condition as the channel measurement result. The interference amount measurement unit 210 may send the measurement interference amount information to a comparison unit 220. The comparison unit 220 may compare the measured interference amount with predetermined thresholds. For this purpose, the comparison unit 220 may have information on predetermined threshold values.

The comparison unit 220 may send the comparison result to an adjustment coefficient determination unit 230, and the interference amount measurement unit 210 may send the channel parameters generated based on the channel measurement result to the adjustment coefficient determination unit 230. The adjustment coefficient determination unit 230 may determine an adjustment coefficient for use in scaling the channel parameters based on the comparison result received from the comparison unit 220.

Once the adjustment coefficient is determined, the adjustment coefficient determination unit 230 may send the adjustment coefficient and channel parameters to a third signal generation unit 240. The third signal generation unit 240 may generate a third signal as a target of decoding using the channel parameters scaled based on the adjustment coefficient. Once the third signal is generated, the third signal generation unit 240 may send the third signal to a decoding unit 250, which performs decoding on the third signal and determines information bits through an LLR calculation.

As described above, the interference cancellation method and apparatus of the present disclosure is advantageous in terms of removing noise from a received signal effectively without compromising an interference cancellation operation by scaling a parameter for use in generating a signal as a target of decoding based on interference amounts measured in association with the signals received by the respective antennas of a base station.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method of a base station having a plurality of antennas in a wireless communication system, the method comprising:
   receiving a first signal by a first antenna and a second signal by a second antenna;
   measuring interference amounts in the first signal and the second signal, based on a result of channel measurement performed on the first signal and the second signal;
   determining an adjustment coefficient based on a first constant for scaling an off-diagonal component and a second constant for scaling a diagonal component obtained based on the measured interference amounts for performing interference rejection combining (IRC), wherein the off-diagonal component and the diagonal component are associated with the first signal and the second signal;
   adjusting channel parameters based on the determined adjustment coefficient;
   generating a third signal as a target of decoding by combining the first signal and the second signal based on the adjusted channel parameter; and
   performing decoding on the third signal,
   wherein the adjustment coefficient is determined by a ratio of the first constant for scaling the diagonal component and the second constant for scaling the off-diagonal component.

2. The method of claim 1,
   wherein generating the third signal comprises applying the channel parameters scaled according to the adjustment coefficient to a predetermined algorithm.

3. The method of claim 2, wherein the channel parameters comprise a covariance matrix generated with channel measurement values and noise values obtained through the channel measurement on the first signal and the second signal, and the covariance matrix comprises the diagonal component associated with noise amounts included in the first signal and the second signal and the off-diagonal component associated with interference amounts included in the first signal and the second signal.

4. The method of claim 1, wherein the adjustment coefficient is determined by comparing the measured interference amounts with a predetermined threshold, wherein the first constant is a constant greater than or equal to 1, and the second constant is a constant greater than or equal to 0.

5. The method of claim 1, wherein the interference amounts are determined by a difference between a received signal strength of interference and noise to the first and the second signals, and a received signal strength of noise to the first signal and the second signal.

6. A base station having a plurality of antennas in a wireless communication system, the base station comprising:

a radio communication unit having a first antenna for receiving a first signal and a second antenna for receiving a second signal; and a controller configured to:
- measure interference amounts in the first signal and the second signal based on a result of channel measurement performed on the first signal and the second signal,
- determine an adjustment coefficient based on a first constant for scaling an off-diagonal component and a second constant for scaling a diagonal component obtained based on the measured interference amounts for performing interference rejection combining (IRC), wherein the off-diagonal component and the diagonal component are associated with the first signal and the second signal,
- adjust channel parameters based on the determined adjustment coefficient,
- generate a third signal as a target of decoding by combining the first signal and the second signal based on the adjusted channel parameters, and
- perform decoding on the third signal,
- wherein the adjustment coefficient is determined by a ratio of the first constant for scaling the diagonal component and the second constant for scaling the off-diagonal component.

7. The base station of claim 6, wherein the controller is further configured to generate the third signal by applying the channel parameter scaled according to the adjustment coefficient to a predetermined algorithm.

8. The base station of claim 7, wherein the channel parameters comprise a covariance matrix generated with channel measurement values and noise values obtained through the channel measurement on the first signal and the second signal, and the covariance matrix comprises the diagonal component associated with noise amounts included in the first signal and the second signal and the off-diagonal component associated with interference amounts included in the first signal and the second signal.

9. The base station of claim 6, wherein the adjustment coefficient is determined by comparing the measured interference amount with a predetermined threshold, wherein the first constant is a constant greater than or equal to 1, and the second constant is a constant greater than or equal to 0.

10. The base station of claim 6, wherein the interference amounts are determined by a difference between a received signal strength of interference and noise to the first signal and the second signal, and a received signal strength of noise to the first signal and the second signal.

* * * * *